United States Patent [19]

Periou et al.

[11] Patent Number: 5,145,467
[45] Date of Patent: Sep. 8, 1992

[54] GEARED MOTOR FOR THE DRIVE OF COMPONENTS, SUCH AS MOTOR-VEHICLE ACCESSORIES, PARTICULARLY AN OPENING ROOF

[75] Inventors: Pierre Periou, Cergy Pontoise; Francois Bardet, Clermont Ferrand, both of France

[73] Assignee: Rockwell Automotive Body Systems, Paris, France

[21] Appl. No.: 723,864

[22] Filed: Jul. 1, 1991

[30] Foreign Application Priority Data

Jul. 6, 1990 [FR] France .................. 90 08634

[51] Int. Cl.⁵ .................. F16H 1/16; F16H 1/20; F16H 1/28
[52] U.S. Cl. .................. 475/162; 74/427; 475/177; 475/180
[58] Field of Search .................. 475/5, 7, 149, 162, 475/164, 180, 176, 177, 178, 179; 74/427

[56] References Cited

U.S. PATENT DOCUMENTS

| | | | |
|---|---|---|---|
| 3,424,036 | 1/1969 | Colgan | 475/180 |
| 4,177,695 | 12/1979 | Grove | 475/162 X |
| 4,674,361 | 6/1987 | Parsons | 475/162 X |
| 4,754,660 | 7/1988 | Kobayashi et al. | 74/427 |

FOREIGN PATENT DOCUMENTS 193245 2/1923 United Kingdom .................. 74/427

Primary Examiner—Leslie A. Braun
Assistant Examiner—David E. Henn

[57] ABSTRACT

This geared motor comprises an outlet shaft (2) of the motor (1), carrying two coaxial screws (3, 4) offset axially and of mutually opposed screw pitch, two gearwheels (5, 6) located on either side of the shaft and each interacting with a screw (3, 4), an axle (7, 8) fastened to each gearwheel and extended by a crankpin (9, 11) eccentric relative to the corresponding axle (7, 8) so as to be capable of executing rotations about this axle, an element (12) equipped with a toothing (13) and linked to the crankpins in such a way as, during the rotation of the crankpins, to be driven in a circular translational movement, the radius of which is equal to the eccentricity of the crankpins, and a member (16) equipped with an output shaft (18) connectable to the component to be driven and carrying a toothing (17) interacting with that of the element so as to bring about a rotation of the member (16) in a ratio determined by the difference in the numbers of teeth of the two toothings. This arrangement makes it possible to accommodate the geared motor in a very small space, while at the same time ensuring that it has sufficient resistance to very high torques.

5 Claims, 2 Drawing Sheets

GEARED MOTOR FOR THE DRIVE OF COMPONENTS, SUCH AS MOTOR-VEHICLE ACCESSORIES, PARTICULARLY AN OPENING ROOF

The subject of the present invention is a geared motor for the drive of components, such as motor-vehicle accessories, for example an opening roof, requiring high torques within a confined space.

For such uses, conventional single-stage reduction systems with a wheel and endless screw do not make it possible to obtain either a sufficient reduction or a mechanical resistance of the toothings compatible with a small overall size.

The object of the invention is, therefore, to provide a geared-motor system capable of withstanding very high torques, whilst at the same time taking up only small amounts of space.

According to the invention, the geared motor is characterised by the following combination of means:

an output shaft of the motor, driving a first wheel-/endless-screw reduction stage comprising two gearwheels driven in synchronism by the screws, an axle fastened to each gearwheel, oriented perpendicularly to the output shaft of the motor and extended by a crankpin eccentric relative to the corresponding axle so as to be capable of executing rotations about this axle, a second reduction stage comprising an element equipped with a toothing and linked to the crankpins in such a way as, during the rotation of the crankpins, to be driven by these in a circular translational movement, the radius of which is equal to the eccentricity of the crankpins, a member equipped with an output shaft connectable to the component to be driven and carrying a toothing interacting with that of the said element, the numbers of teeth of the toothings of the element and of the said member being different so as to bring about a rotation of the member in a ratio determined by the difference in the numbers of teeth of the two toothings.

This system therefore comprises two reduction stages: a first endless-screw stage which provides a high reduction with good efficiency, and a second stage consisting of the element and the abovementioned member equipped with paired toothings, which allows a large number of teeth in engagement, giving it a mechanical resistance sufficient for considerable forces within a very confined space.

According to a first embodiment of the invention, the said element linked to the crankpins has two bearings, in each of which a crankpin pivots, and the said toothing is formed internally to this element, the number of teeth of this toothing being larger than that of the toothing of the output member.

According to a second possible embodiment of the invention, the said element linked to the crankpins is a gearwheel in which the crankpins pivot, and the output member is a ring equipped with an internal toothing surrounding the said gearwheel, this ring being fixed in terms of rotation to the output shaft, and its toothing having a number of teeth larger than that of the toothing of the associated inner wheel.

The invention will now be described with reference to the accompanying drawings which illustrate two embodiments of it as non-limiting examples.

Figure 1:
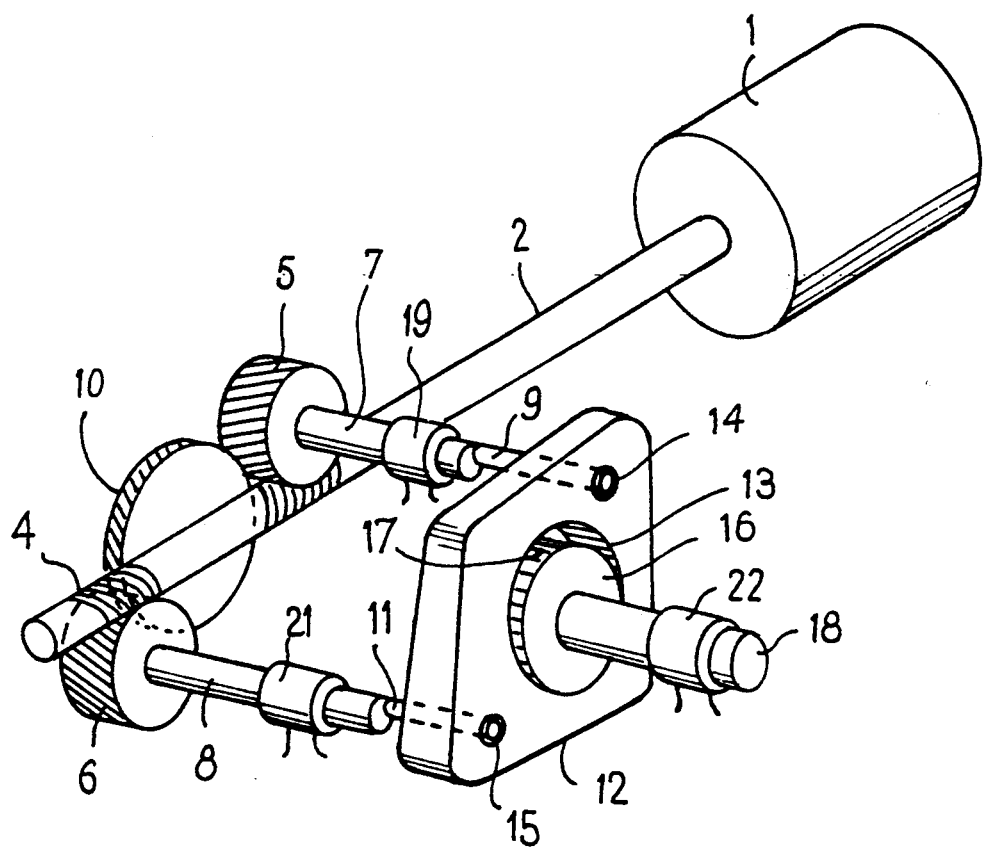
FIG. 1 is a perspective view of a first embodiment of the geared motor according to the invention.

The geared motor illustrated in FIG. 1 is intended for the drive of components (not shown), such as motor-vehicle accessories, particularly an opening roof.

This geared motor comprises an electric motor 1 connected to a direct-current source (not shown) (battery), an output shaft 2 of the motor 1, carrying two coaxial screws 3 and 4 offset axially at a suitable distance and of mutually opposed screw pitch, two gearwheels 5, 6 located on either side of the shaft 2 and each interacting with a screw 3, 4, an axle 7, 8 fastened respectively to each gearwheel 5, 6, oriented perpendicularly to the shaft 2 and extended by a crankpin 9, 11 eccentric relative to the corresponding axle 7, 8 so as to be capable of executing rotations about this axle;

an element 12 which is equipped with an internal toothing 13 and consists, in this example, of a plate extending in a plane substantially perpendicular to the axles 7 and 8 and in which are formed bearings 14, 15 where the ends of the respective crankpins 9 and 11 can pivot;

and an end wheel 16 engaged in the circular orifice, on the periphery of which is formed the toothing 13, this wheel 16 carrying a toothing 17 capable of meshing with the toothing 13.

The end wheel 16 supports an output shaft 18 connected to the component to be driven. The axles 7, 8 and the shaft 18 rotate in respective bearings 19, 21, 22, and an intermediate gearwheel 10 is arranged between the two gearwheels 5, 6 so as to mesh with these in order to ensure their synchronism.

The internal toothing 13 of the plate 12 comprises a number of teeth Z3 larger than the number of teeth Z4 of the toothing 17.

The geared-motor system just described functions as follows.

When the motor 1 rotates, the screws 3, 4 drive the respective gearwheels 5, 6 in the same direction of rotation on account of the reversal of the threads of the screws 3, 4. The axles 7, 8 consequently rotate in the same direction, and the corresponding crankpins 9, 11 execute a rotation, the radius of which is equal to the eccentricity of the crankpins 9, 11 relative to the geometrical axes of the axles 7, 8. On the other hand, the two crankpins 9, 11 are sufficiently distant from one another to impart to the plate 12 a circular translational movement, the radius of which is equal to the eccentricity of the crankpins 9, 11, this movement occurring at all points of the plate 12.

This results in a rotation of the wheel 16 in a ratio $(Z3-Z4)/Z4$ relative to the rotation of the eccentric crankpins 9, 11, with a relatively large number of teeth of the toothing 17 in engagement with the toothing 13.

The advantage of this arrangement emerges when Z3 tends towards Z4: a high reduction is then obtained, whilst the number of teeth in mutual engagement is increased.

As a non-limiting illustrative example, for $Z3=18$ and $Z4=17$ a ratio $r=1/17$ is obtained, that is to say, for every revolution of the plate 12, the wheel 16 rotates by one tooth.

It is also expedient to note that the gearing 13, 17 can be positioned independently of the other component elements of the system (9, 11, 7, 8, etc.), thus making it possible to adapt the device to the space restrictions.

Figure 2:
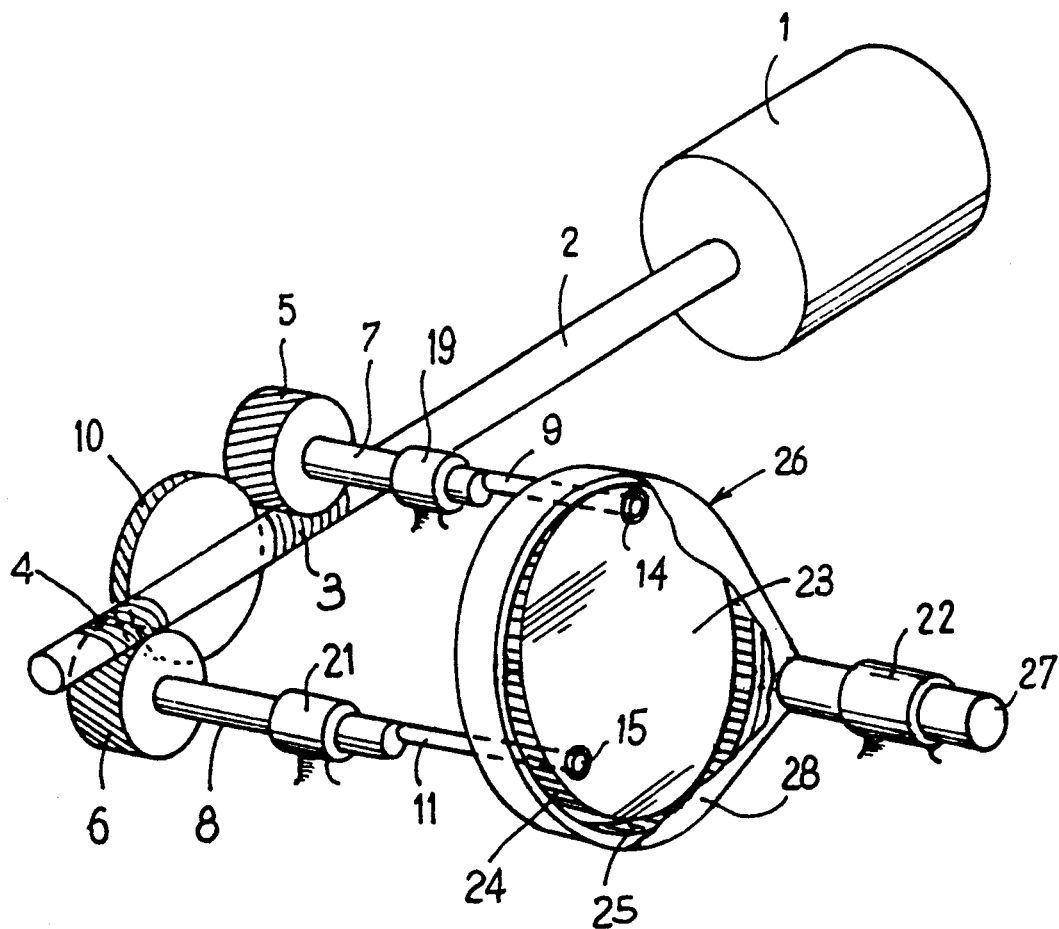
FIG. 2 is a perspective view of a second embodiment of the geared motor according to the invention.

The second embodiment of the geared motor to which the invention relates and which is illustrated in FIG. 2 differs from the preceding one in that the two crankpins 9 and 11 pivot in respective bearings 14, 15 of a gearwheel 23, the toothing 24 of which interacts with the toothing 25 of a ring 26 fixed to the output shaft 27. This fixing is obtained, for example, by means of a rigid cone 28, the base of which is fastened to the periphery of the ring 26 and the apex of which is fastened to one end of the shaft 27.

The number of teeth Z5 of the toothing 25 is larger than the number Z6 of teeth of the toothing 24, so that the reduction ratio of this stage becomes: $-(Z6-Z5)/Z6$, the other characteristics of the device being unchanged.

We claim:

1. Geared motor for the drive of components, such as motor-vehicle accessories, comprising a motor (2), characterised in that it comprises:

an output shaft (2) of the motor, driving a first reduction stage including endless first and second screws (3, 4) engaging respective first and second gearwheels (5, 6) driven in synchronism, first and second axles (7, 8) fastened to respective first and second gearwheels, oriented perpendicularly to the output shaft (2) of the motor and connected to respective first and second crankpins (9, 11) which provide eccentric motion relative to the corresponding first and second axles (7, 8), a second reduction stage comprising an element (12, 23) equipped with a toothing (13, 24) and linked to the first and second crankpins in such a way as to drive said element in a circular translational movement upon rotation of the first and second crankpins, an output member (16, 26) equipped with an output shaft (18, 27) connectable to the component to be driven and carrying a toothing (17, 25) interacting with that of the said element, the numbers of teeth of the toothings of the element and of the said member being different so as to bring about a rotation of the member (16, 26) in a ratio determined by the difference in the numbers of teeth of the two toothings.

2. Geared motor according to claim 1, characterised in that the said element (12) linked to the crankpins (9, 11) has two bearings (14, 15), in each of which a crankpin pivots, and the said toothing (13) is formed internally to this element, the number of teeth of this toothing (13) being larger than that of the toothing (17) of the output member (16).

3. Geared motor according to claim 1, characterised in that the said element linked to the crankpins is a third gearwheel (23) in which the crankpins (9, 11) pivot, and the output member is a ring (26) equipped with an internal toothing (25 surrounding the said third gearwheel (23), this ring being fixed in terms of rotation to the output shaft (27, and its toothing having a number of teeth larger than that of the toothing of the associated inner wheel (23).

4. Geared motor according to claim 1, characterised in that comprises an intermediate wheel (10) arranged between the two gearwheels (5, 6) interacting with the screws (3, 4), and meshing with the said wheels in order to ensure their synchronism.

5. Geared motor according to claim 1, characterised in that the output shaft (2) of the motor carries two coaxial screws (3, 4) offset axially and of mutually opposed screw pitch, and the two gearwheels (5, 6) are located on opposing radial sides of the shaft, each interacting with a screw (3, 4).

* * * * *